United States Patent
Alemany (10) Patent No.: US 10,341,358 B2
(45) Date of Patent: Jul. 2, 2019

(54) AUTHENTICATION OF MANUAL METER READINGS

(71) Applicant: Silver Spring Networks, Inc., Redwood City, CA (US)

(72) Inventor: Juan Alemany, Sunnyvale, CA (US)

(73) Assignee: ITRON NETWORKED SOLUTIONS, INC., Liberty Lake, WA (US)

(*) Notice: Subject to any disclaimer, the term of this patent is extended or adjusted under 35 U.S.C. 154(b) by 25 days.

(21) Appl. No.: 14/283,091

(22) Filed: May 20, 2014

(65) Prior Publication Data

US 2014/0344906 A1 Nov. 20, 2014

Related U.S. Application Data

(60) Provisional application No. 61/825,178, filed on May 20, 2013.

(51) Int. Cl.
    *H04L 29/06* (2006.01)
(52) U.S. Cl.
    CPC .................. *H04L 63/12* (2013.01)

(58) Field of Classification Search
    CPC .................. H04L 9/00; G06F 12/00
    See application file for complete search history.

(56) References Cited

U.S. PATENT DOCUMENTS

| | | | | |
|---|---|---|---|---|
| 5,243,654 A | * | 9/1993 | Hunter | G06Q 20/401 380/51 |
| 2005/0222933 A1 | * | 10/2005 | Wesby | G06Q 40/00 705/36 R |
| 2010/0306533 A1 | * | 12/2010 | Phatak | G06F 21/34 713/156 |

* cited by examiner

*Primary Examiner* — Joseph P Hirl
*Assistant Examiner* — Leynna T Truvan
(74) *Attorney, Agent, or Firm* — Artegis Law Group, LLP (57) ABSTRACT

A method for authenticating a meter reading. The method includes obtaining a measurement representing a measured attribute of a user, analyzing the measurement to generate an authentication code, generating the meter reading based on the measurement and the authentication code, presenting, by the metering device, the meter reading to the user who alters and reports the meter reading as a reported meter reading, analyzing, by a meter reading analysis device, the reported meter reading to detect that the meter reading was altered by the user, and generating, by the meter reading analysis device and in response to the detecting, a dispatch request to dispatch a human inspector for validating the measurement.

26 Claims, 4 Drawing Sheets

AUTHENTICATION OF MANUAL METER READINGS

CROSS-REFERENCE TO RELATED APPLICATIONS

This application claims priority, pursuant to 35 U.S.C. § 119(e), to U.S. Provisional Application No. 61/825,178, filed on May 20, 2013, the entirety of which is incorporated by reference herein.

BACKGROUND

A utility meter is a device installed at a customer premise (e.g., a home or business) that measures the amount of consumption of electricity, gas, water, etc. provided by the utility service provider (e.g., a water company). Periodic readings of utility meters (e.g., by a human inspector) establishes billing cycles and consumption during a billing cycle. When the utility meter is not visible to the inspector from outside of the customer premise, the meter readings may be provided manually by the customer and may be inaccurate. Other examples of self-reporting of meter readings include reporting medical meter readings to a medical insurance provider and reporting a vehicle odometer reading to a vehicle regulatory agency.

SUMMARY

In general, in one aspect, the invention relates to a method for authenticating a meter reading. The method includes obtaining a measurement from a sensor of a metering device, wherein the measurement represents an attribute of a user as measured by the sensor, analyzing, by a computer processor of the metering device and using a pre-determined encoding algorithm, the measurement to generate an authentication code, generating, by the computer processor of the metering device, the meter reading based on the measurement and the authentication code, presenting, by the metering device, the meter reading to the user, wherein the meter reading is altered and reported by the user as a reported meter reading to a meter reading analysis device, analyzing, by the meter reading analysis device based on a pre-determined decoding algorithm associated with the pre-determined encoding algorithm, the reported meter reading to detect that the meter reading was altered by the user, and generating, by the meter reading analysis device and in response to the detecting, a dispatch request to dispatch a human inspector for validating the measurement.

In general, in one aspect, the invention relates to a metering device. The metering device includes a sensor configured to obtain a measurement that represents an attribute of a user, a meter reading generator configured to analyze, using a pre-determined encoding algorithm, the measurement to generate an authentication code, and generate the meter reading based on the measurement and the authentication code, and a display configured to present the meter reading to the user, wherein the meter reading is altered and reported by the user as a reported meter reading to a meter reading analysis device, wherein the reported meter reading is analyzed, by the meter reading analysis device based on a pre-determined decoding algorithm associated with the pre-determined encoding algorithm, to detect that the meter reading was altered by the user, and wherein the meter reading analysis device generates, in response to the detecting, a dispatch request to dispatch a human inspector for validating the measurement.

In general, in one aspect, the invention relates to a meter reading analysis device. The meter reading analysis device includes an input module configured to receive a reported meter reading from a user, wherein the reported meter reading is a result of the user altering a meter reading presented by a metering device to the user, wherein the meter reading is generated by the metering device based on a measurement and an authentication code of the measurement, wherein the measurement represents an attribute of a user as measured by a sensor of the metering device, and wherein the authentication code is generated by the metering device analyzing the measurement using a pre-determined encoding algorithm, the measurement, an analysis module configured to analyze, based on a pre-determined decoding algorithm associated with the pre-determined encoding algorithm, to detect that the meter reading was altered by the user, and an output module configured to generate, in response to the detecting, a dispatch request to dispatch a human inspector for validating the measurement.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to validate manual meter readings by augmenting each meter reading with an automatically generated authentication code. Specifically, both the meter reading and the authentication code are displayed for manual reading and reporting. In one or more embodiments, the authentication code includes a machine generated cyclic redundancy check (CRC) that is used by a meter reading analysis device to determine whether any alteration has occurred during the manual meter reading and reporting.

Figure 1:
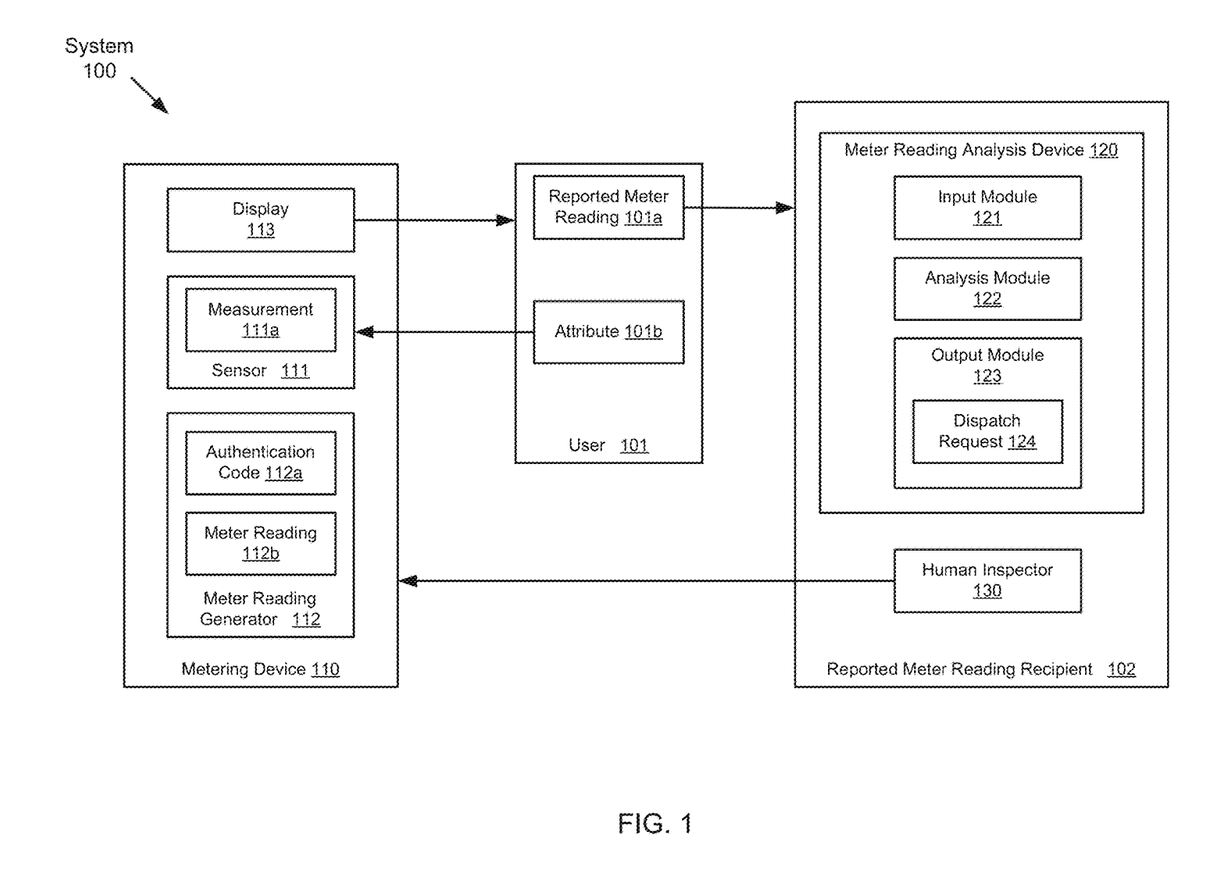
FIG. 1 shows a schematic system diagram in accordance with one or more embodiments of the invention.

FIG. 1 shows a diagram of a system (100) in accordance with one or more embodiments of the invention. The system (100) includes a metering device (110), a user (101), and a reported meter reading recipient (102). Each of these components is further described below.

In one or more embodiments of the invention, the user (101) is a person who uses the metering device (110) to measure an attribute (101b) of the user (101). Specifically, the measurement result (i.e., meter reading) from using the metering device (110) is reported by the user (101) as the reported meter reading (101a) to the reported meter reading recipient (102).

In one or more embodiments, the metering device (110) is a utility meter, such as an electricity meter, a gas meter, a water meter, etc. that is installed at the home of the user (101) or a business associated with the user (101). The attribute (101b) represents the consumption of electricity, gas, water, etc. of the home or business associated with the user (101). For example, the user (101) may be an owner, an employee, or other associated person of the business. Further, the reported meter reading recipient (102) is a utility service provider, such as an electricity company, a gas company, a water company, etc. For example, the utility service provider may generate a billing statement based on the reported meter reading (101a).

In one or more embodiments, the metering device (110) is a medical meter, such as a thermometer, a blood pressure meter, a heart rate monitor, an electrocardiogram (EKG) device, etc. The attribute (101b) represents the body temperature, blood pressure, heart rate, EKG readings, etc. of the user (101). Further, the reported meter reading recipient (102) may be a medical insurance provider that makes medical insurance related decisions based on the reported meter reading (101a). For example, the medical insurance provider may determine whether to provide insurance coverage to the user (101) based on the reported meter reading (101a).

In one or more embodiments, the metering device (110) is a vehicle odometer, such as installed in an automobile, an airplane, a watercraft, etc. The attribute (101b) represents the mileage of the vehicle driven by the user (101) for personal or business use. Further, the reported meter reading recipient (102) may be a vehicle regulatory agency (e.g., the Department of Motor Vehicles (DMV)) or a vehicle insurance provider. For example, the DMV may perform vehicle registration or registration renewal for the user (101) based on the reported meter reading (101a). In another example, the vehicle insurance provider may determine the insurance premium for the user (101) based on the reported meter reading (101a).

In one or more embodiments of the invention, the metering device (110) includes a sensor (111) that is configured to obtain a measurement (111a) that represents the attribute (101b) of the user (101). In one or more embodiments, the measurement (111a) may be a number, an alphanumerical string, or other suitable representation of the attribute (101b). In the embodiments where the metering device (110) is a utility meter, the sensor (111) may be an electricity current sensor, a gas flow sensor, a water flow sensor, etc. The measurement (111a) may represent electrical consumption, gas consumption, water consumption, etc. associated with the user (101). In the embodiments where the metering device (110) is a medical meter, the sensor (111) may be a body temperature sensor, a blood pressure sensor, a heart beat sensor, an EKG sensor, etc. The measurement (111a) may represent the body temperature, the blood pressure, the heart rate, the EKG readings, etc. of the user (101). In the embodiments where the metering device (110) is a vehicle odometer, the sensor (111) may be a tire rotation sensor, an aircraft/watercraft travel distance sensor, etc. The measurement (111a) may represent the mileage of the vehicle driven by the user (101).

In one or more embodiments of the invention, the metering device (110) includes a meter reading generator (112) that is configured to analyze the measurement (111a) to generate an authentication code (112a). The meter reading generator (112) also includes functionality to generate the meter reading (112b) based on the measurement (111a) and the authentication code (112a). In one or more embodiments, the authentication code (112a) may be a number, an alphanumerical string, or in other suitable format. For example, the authentication code (112a) may be generated by applying an encoding algorithm to the measurement (111a). In one or more embodiments of the invention, the metering device (110) generates the authentication code (112a) and the meter reading (112b) based on the method described in reference to FIG. 2 below.

In one or more embodiments of the invention, the metering device (110) includes a display (113) that is configured to present the meter reading (112b) to the user (101). In one or more embodiments, the display (113) may be an electronic display, an electromechanical display, or a combination thereof. For example, the electronic display may present the meter reading (112b) using a liquid-crystal-display (LED) panel, a plasma display panel, a cathode-ray-tube (CRT), or other electronic display device. In another example, the electromechanical display may present the meter reading (112b) using physical digits or pointing needles that are rotated by an electromechanical mechanism. In yet another example, certain digits of the meter reading (112b) may be presented using the electronic display while the remaining digits of the meter reading (112b) may be presented using the electromechanical display.

In one or more embodiments of the invention, the meter reading (112b) is manually altered and reported by the user (101) as the reported meter reading (101a) to the reported meter reading recipient (102). For example, the meter reading (112b) may be intentionally altered by the user (101) to evade utility billing charges, to falsify insurance or agency records, or for other unauthorized/malicious purposes.

In one or more embodiments of the invention, the reported meter reading recipient (102) is an entity that receives the reported meter reading (101a) from the user (101). In one or more embodiments, the reported meter reading recipient (102) uses the meter reading analysis device (120) to validate the reported meter reading (101a) as received from the user (101). Specifically, the meter reading analysis device (120) includes hardware and/or software components, such as an input module (121), an analysis module (122), and an output module (123).

In one or more embodiments, the input module (121) is configured to receive the reported meter reading (101a) from the user (101). For example, the reported meter reading (101a) may be manually reported (e.g., via a telephone call, a paper note, a completed paper form, etc.) by the user (101) to the reported meter reading recipient (102) where a human data entry operator may input the reported meter reading (101a) to the input module (121). In another example, the reported meter reading (101a) may be electronically submitted (e.g., via an electronic message, a graphical user interface, etc.) by the user (101) to the input module (121) using a computing device (not shown).

In one or more embodiments, the analysis module (122) is configured to analyze the reported meter reading (101a) to detect that the meter reading (112b) was altered by the user (101). For example, the reported meter reading (101a) may be analyzed based on a decoding algorithm that is associated with the encoding algorithm used by the meter reading generator (112) to generate the authentication code (112).

In one or more embodiments, the output module (123) is configured to generate a dispatch request (124) to dispatch a human inspector (130) for validating the measurement (111a). Specifically, the dispatch request (124) is generated in response to detecting that the meter reading (112*b*) was altered by the user (101). As used herein, a human inspector (130) is a person who visits where the metering device (110) is located to obtain the meter reading (112*b*) directly without the meter reading (112*b*) being altered by the user (101). For example, the human inspector (130) may be an employee, a contractor, an agent, or other types of representative of the reported meter reading recipient (102). In the embodiments where the metering device (110) is a utility meter, the human inspector (130) may visit the metering device (110) without notifying the user (101). In the embodiments where the metering device (110) is a medical meter, the human inspector (130) may visit the user (101) and request a re-measurement that is witnessed by the human inspector (130). In the embodiments where the metering device (110) is an odometer, the human inspector (130) may visit the user (101) to gain access to the odometer for obtaining the meter reading (112*b*) in person.

In one or more embodiments of the invention, the reported meter reading recipient (102) validates the reported meter reading (101*a*) based on the method described in reference to FIG. 2 below.

Figure 2:
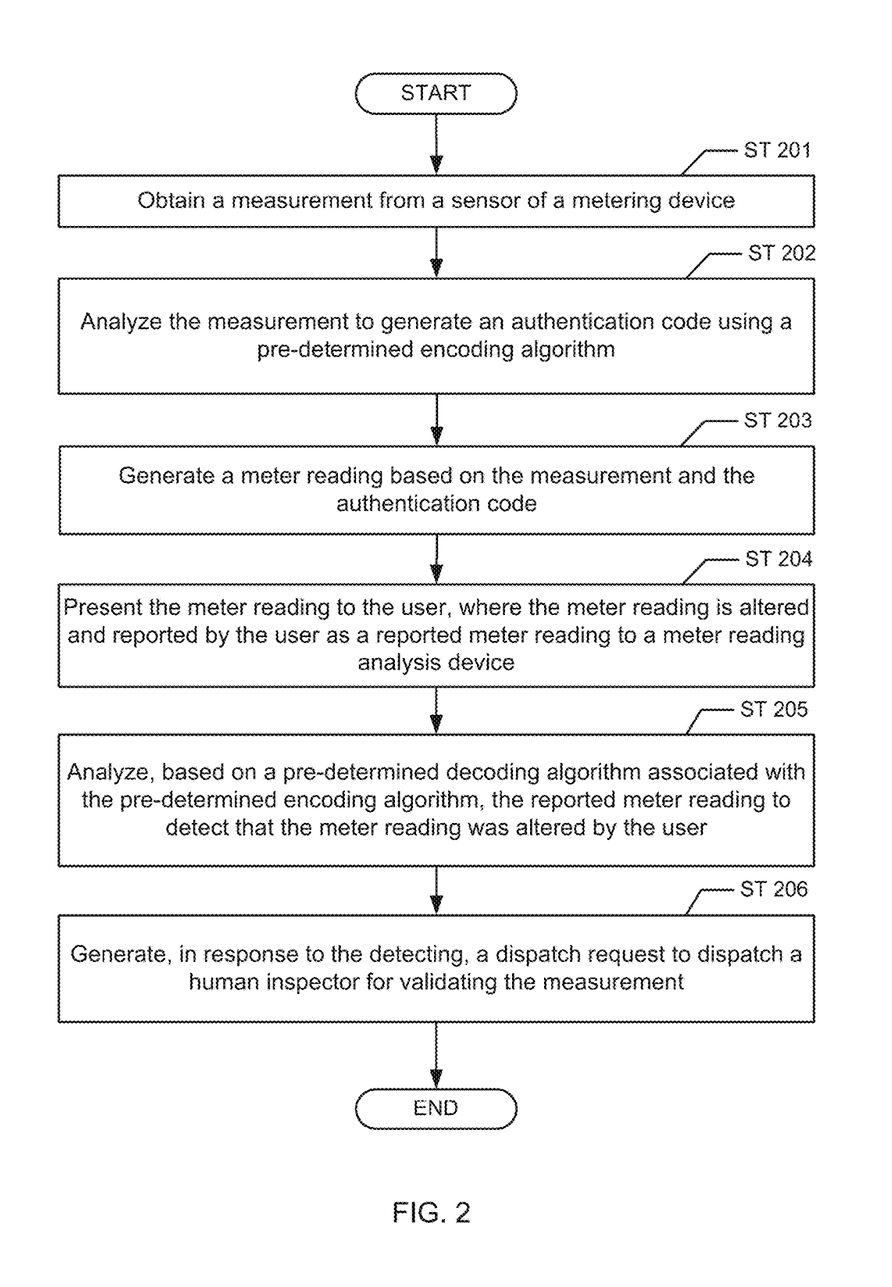
FIG. 2 shows a flowchart in accordance with one or more embodiments of the invention.

FIG. 2 shows a flowchart in accordance with one or more embodiments of the invention. In one or more embodiments of the invention, the method of FIG. 2 may be practiced using the system (100) described in reference to FIG. 1 above. In one or more embodiments of the invention, one or more of the steps shown in FIG. 2 may be omitted, repeated, and/or performed in a different order than that shown in FIG. 2. Accordingly, the specific arrangement of steps shown in FIG. 2 should not be construed as limiting the scope of the invention.

Initially, in Step 201, a measurement is obtained from a sensor of a metering device. In one or more embodiments of the invention, the measurement represents an attribute of a user as measured by the sensor. For example, the measurement may include an alphanumerical string (i.e., digits of numerals and/or alphanumerical symbols) representing a measured quantity generated by the sensor.

In Step 202, the measurement is analyzed by a computer processor of the metering device and using a pre-determined encoding algorithm to generate an authentication code. For example, the authentication code may include additional digits that may be combined with the measurement. In one or more embodiments of the invention, the pre-determined encoding algorithm includes one or more of a parity bit, a cyclic redundancy check, a cryptographic hash function, an error correcting code, or other suitable encoding scheme known to one skilled in the art or may be developed in the future.

In Step 203, the meter reading is generated by the computer processor of the metering device based on the measurement and the authentication code. In one or more embodiments of the invention, the meter reading includes a pair of two separate alphanumerical strings, i.e., the measurement and the authentication code. In one or more embodiments of the invention, the digits of the measurement and additional digits of the authentication code are combined to generate the meter reading. For example, the digits of the measurement and additional digits of the authentication code may be concatenated and/or interposed to generate the meter reading. In other words, the meter reading is a single number including the authentication code inserted in front of the measurement, appended at the end of the measurement, or interposed with the measurement.

In Step 204, the meter reading is presented by the metering device to the user. For example, the meter reading may be visibly displayed on a display device such as an LED panel, audibly presented using an audio transducer such as a speaker, etc. In one or more embodiments of the invention, the meter reading is altered and reported by the user as a reported meter reading to a meter reading analysis device. For example, one or more digits of the meter reading may be substituted, skipped, inserted, deleted, increased, decreased, transposed, or otherwise altered. The altered digits may be part of the measurement and/or authentication code contained in the meter reading. In one or more embodiments, the reported meter reading is reported by the user to a human operator who in turn enters the reported meter reading into the meter reading analysis device. In one or more embodiments, the reported meter reading is entered directly by the user into the meter reading analysis device.

In Step 205, the reported meter reading is analyzed by the meter reading analysis device to detect that the meter reading was altered by the user. In one or more embodiments, the reported meter reading is analyzed based on a pre-determined decoding algorithm associated with the pre-determined encoding algorithm used in Step 202 above. In one or more embodiments of the invention, the pre-determined decoding algorithm includes one or more of a parity bit, a cyclic redundancy check, a cryptographic hash function, an error correcting code, or other suitable decoding scheme known to one skilled in the art or may be developed in the future.

In Step 206, in response to detecting that the meter reading was altered by the user, a dispatch request is generated by the meter reading analysis device to dispatch a human inspector for validating the measurement. In one or more embodiments of the invention, the dispatch request may be in the form of a paper notice, an electronic mail, a voice message, or other suitable format to notify the human inspector.

Figure 3:
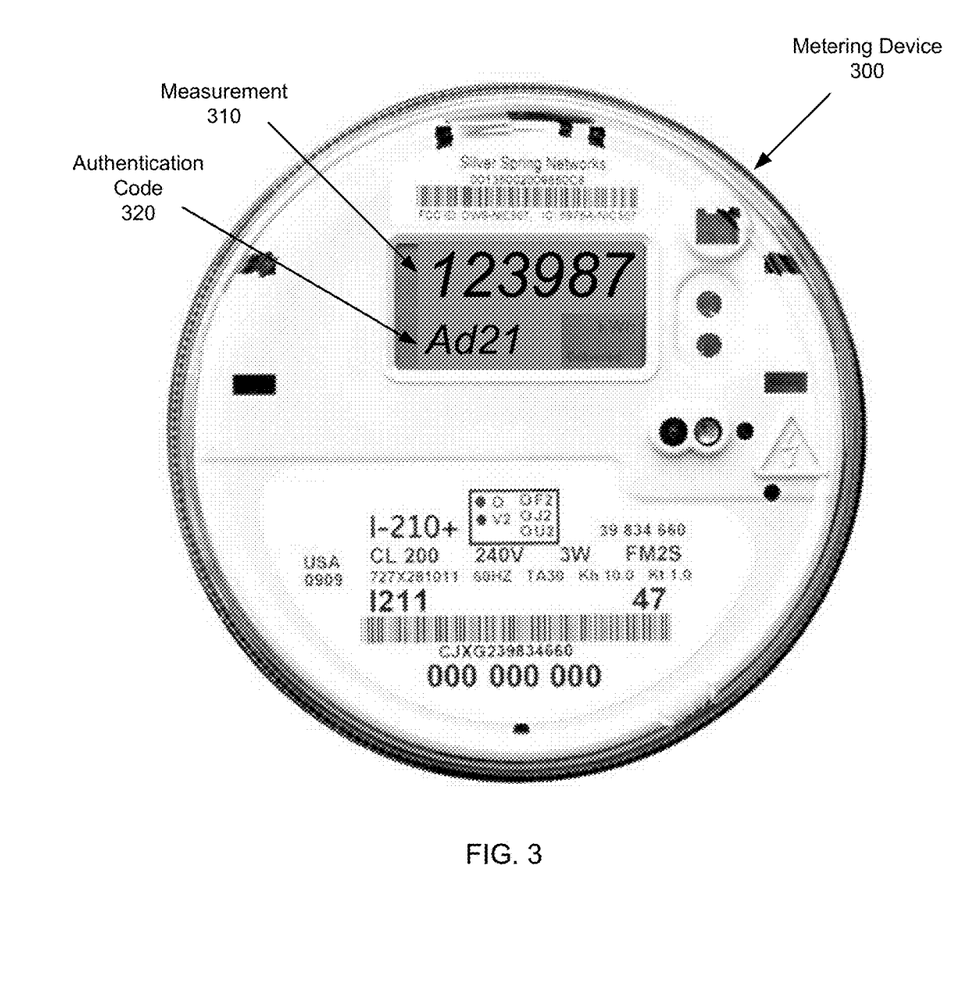
FIG. 3 shows an example in accordance with one or more embodiments of the invention.

FIG. 3 shows an example in accordance with one or more embodiments of the invention. Specifically, FIG. 3 shows a picture of a metering device (300), which is an electrical meter used by a power company to monitor the electrical power consumption of a customer's home. As shown in FIG. 3, the metering device (300) includes a LED panel displaying the measurement (310) and an authentication code (320). In particular, the measurement (310) is a numerical string "123987" representing the amount of consumed electrical power in the unit of kilo-watt-hour (kWh). The authentication code (320) is an alphanumerical string "Ad21" generated by applying an encoding algorithm to the numerical string "123987" contained in the measurement (310). For example, the particular encoding algorithm generates an odd parity digit (i.e., "1") of the numerical string "123987" as the lease significant digit (LSD) of the authentication code (320) (i.e., "Ad21"). In other words, the sum of adding the LSD of the alphanumerical string "Ad21" and all digits in the numerical string "123987" is an odd number. In addition, the encoding algorithm generates remaining digits (i.e., "Ad2") of the authentication code (320) according to a different encoding scheme.

In an example scenario, the customer is asked to include the authentication code (320) when reporting the measurement (310) to the power company. The customer attempts to evade billing charges by altering the measurement (310) and reports an altered numerical string "113987" with the alphanumerical string "Ad21". However, this alteration is detected by a meter reading analysis device used by the power company. For example, the meter reading analysis device detects the alteration by at least applying an odd parity decoding algorithm to the altered numerical string "113987" and the lease significant digit in the alphanumerical string "Ad21". In particular, the sum of adding the LSD of the alphanumerical string "Ad21" and all digits in the altered numerical string "113987" is now an even number indicating the alteration. The additional digits (i.e., "Ad2") of the authentication code (320) may be used to further detect other types of alteration. In response to detecting the alteration, the meter reading analysis device sends an email dispatch request to a human inspector of the power company to visit the customer's home and obtains the unaltered meter reading.

Although the measurement (310) and the authentication code (320) are shown in FIG. 3 as the numerical string "123987" and the alphanumerical string "Ad21" displayed on two separate rows, the numerical string "123987" and the alphanumerical string "Ad21" may also be combined into a single alphanumerical string when displayed on the metering device (300). For example, the numerical string "123987" and the alphanumerical string "Ad21" may be concatenated into the single alphanumerical string "123987Ad21" before being displayed in a single row on the metering device (300).

Figure 4:
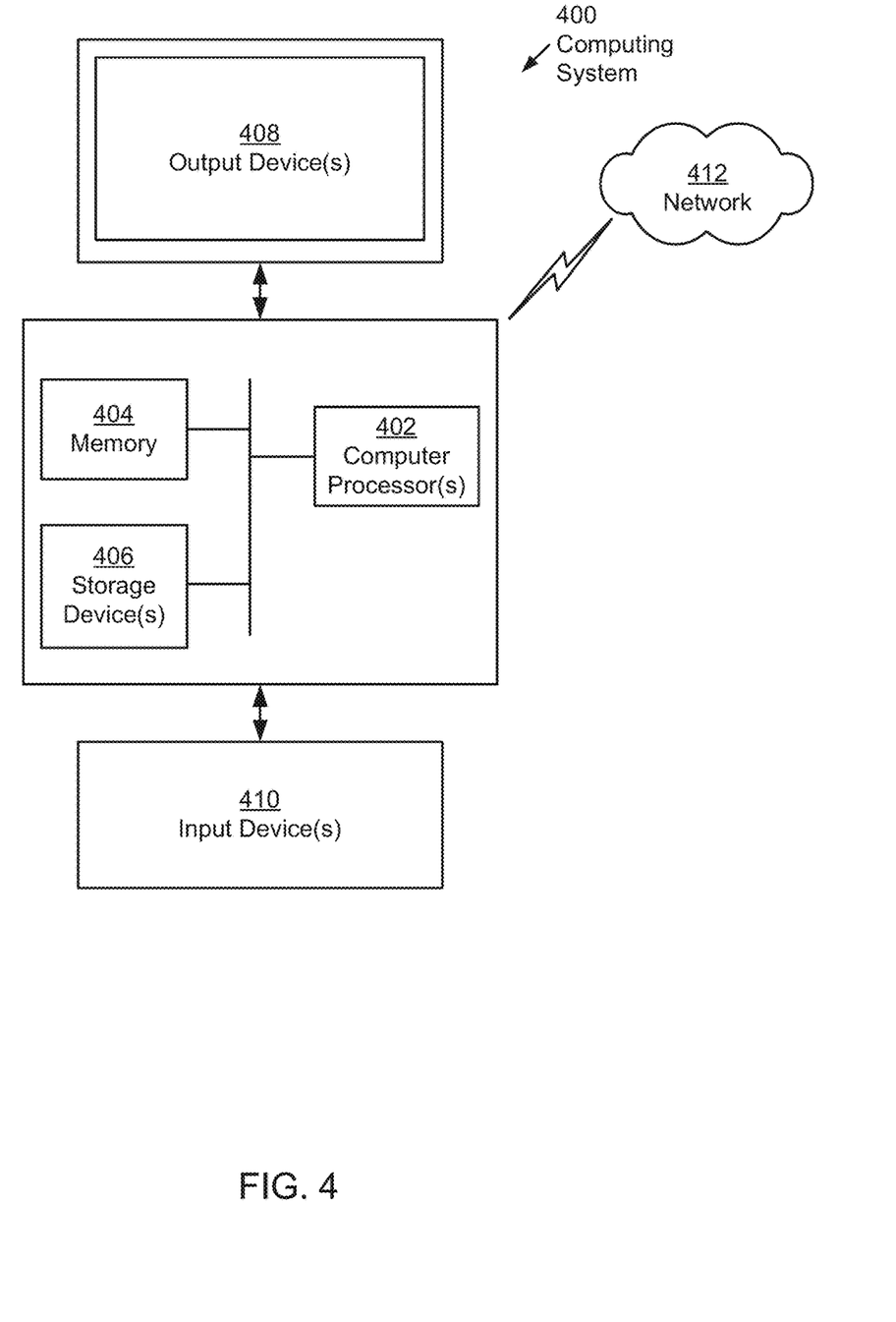
FIG. 4 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for authenticating a meter reading, comprising:
   obtaining a measurement from a sensor of a metering device, wherein the measurement represents an attribute of a user as measured by the sensor;
   applying, by a computer processor of the metering device, a predetermined encoding algorithm to the measurement to generate an authentication code comprising a first subset values and a second subset of values by applying a first encoding scheme to generate the first subset of values and a second encoding scheme to generate the second subset of values, wherein the second encoding scheme is different from the first encoding scheme;
   generating, by the computer processor of the metering device, the meter reading by combining the measurement with the authentication code;
   presenting, by the metering device, the meter reading to the user;
   receiving, at a meter reading analysis device, a reported meter reading from a user, wherein the reported meter reading comprises a different value than the meter reading presented to the user;
   applying, by the meter reading analysis device, a pre-determined decoding algorithm associated with the pre-determined encoding algorithm to the reported meter reading to detect that the reported meter reading does not equal the meter reading; and
   generating, by the meter reading analysis device and in response to the detecting, a dispatch request to dispatch a human inspector for validating the measurement.

2. The method of claim 1,
   wherein the metering device comprises a utility meter, and
   wherein the meter reading analysis device is used by a utility service provider.

3. The method of claim 1,
   wherein the metering device comprises a medical meter, and
   wherein the meter reading analysis device is used by a medical insurance provider.

4. The method of claim 1,
wherein the metering device comprises a vehicle odometer, and
wherein the meter reading analysis device is used by a vehicle regulatory agency.

5. The method of claim 1,
wherein the meter reading comprises a combination of a first plurality of digits of the measurements and a second plurality of digits of the authentication code.

6. The method of claim 1,
wherein the pre-determined decoding algorithm and the pre-determined encoding algorithm comprise at least one selected from a group consisting of a cyclic redundancy check and a cryptographic hash function.

7. The method of claim 1,
wherein the pre-determined decoding algorithm and the pre-determined encoding algorithm comprise an error correcting code.

8. A metering device, comprising:
a sensor configured to obtain a measurement that represents an attribute of a user;
a meter reading generator configured to:
 apply a pre-determined encoding algorithm to the measurement to generate an authentication code comprising a first subset values and a second subset of values by applying a first encoding scheme to generate the first subset of values and a second encoding scheme to generate the second subset of values, wherein the second encoding scheme is different from the first encoding scheme, and
 generate the meter reading by combining the measurement with the authentication code; and
a display configured to present the meter reading to the user,
wherein a reported meter reading is received at a meter reading analysis device from a user, wherein the reported meter reading comprises a different value than the meter reading presented to the user,
wherein the meter reading analysis device applies a pre-determined decoding algorithm associated with the pre-determined encoding algorithm to the reported meter reading to detect that the reported meter reading does not equal the meter reading, and
wherein the meter reading analysis device generates, in response to the detecting, a dispatch request to dispatch a human inspector for validating the measurement.

9. The metering device of claim 8,
wherein the metering device comprises a utility meter, and
wherein the meter reading analysis device is used by a utility service provider.

10. The metering device of claim 8,
wherein the metering device comprises a medical meter, and
wherein the meter reading analysis device is used by a medical insurance provider.

11. The metering device of claim 8,
wherein the metering device comprises a vehicle odometer, and
wherein the meter reading analysis device is used by a vehicle regulatory agency.

12. The metering device of claim 8,
wherein the meter reading comprises a combination of a first plurality of digits of the measurements and a second plurality of digits of the authentication code.

13. The metering device of claim 8,
wherein the pre-determined decoding algorithm and the pre-determined encoding algorithm comprise at least one selected from a group consisting of a cyclic redundancy check and a cryptographic hash function.

14. The metering device of claim 8,
wherein the pre-determined decoding algorithm and the pre-determined encoding algorithm comprise an error correcting code.

15. A meter reading analysis device, comprising:
an input module configured to receive a reported meter reading from a user,
 wherein the reported meter reading comprises a different value than a meter reading presented by a metering device to the user,
 wherein the meter reading is generated by the metering device by combining a measurement with an authentication code of the measurement,
 wherein the measurement represents an attribute of a user as measured by a sensor of the metering device, and
 wherein the metering device applies a pre-determined encoding algorithm to the measurement to generate the authentication code comprising a first subset values and a second subset of values by applying a first encoding scheme to generate the first subset of values and a second encoding scheme to generate the second subset of values, wherein the second encoding scheme is different from the first encoding scheme;
an analysis module configured to apply a pre-determined decoding algorithm associated with the pre-determined encoding algorithm to the reported meter reading to detect that the reported meter reading does not equal the meter reading; and
an output module configured to generate, in response to the detecting, a dispatch request to dispatch a human inspector for validating the measurement.

16. The meter reading analysis device of claim 15,
wherein the metering device comprises a utility meter, and
wherein the meter reading analysis device is used by a utility service provider.

17. The meter reading analysis device of claim 15,
wherein the metering device comprises a medical meter, and
wherein the meter reading analysis device is used by a medical insurance provider.

18. The meter reading analysis device of claim 15,
wherein the metering device comprises a vehicle odometer, and
wherein the meter reading analysis device is used by a vehicle regulatory agency.

19. The meter reading analysis device of claim 15,
wherein the meter reading comprises a combination of a first plurality of digits of the measurements and a second plurality of digits of the authentication code.

20. The meter reading analysis device of claim 15,
wherein the pre-determined decoding algorithm and the pre-determined encoding algorithm comprise at least one selected from a group consisting of a cyclic redundancy check, a cryptographic hash function, and an error correcting code.

21. The method of claim 1, wherein combining the measurement with the authentication code comprises concatenating the measurement and the authentication code.

22. The method of claim 1, wherein combining the measurement with the authentication code comprises interposing the measurement and the authentication code.

23. The method of claim 1, wherein the meter reading comprises a single value comprising a combination of the measurement and the authentication code.

24. The method of claim 1, wherein:
the meter reading comprises a combination of the measurement and the authentication code; and
the reported meter reading comprises a combination of a reported measurement and a reported authentication code, wherein the reported measurement comprises an alteration of the measurement of the meter reading.

25. The method of claim 1, wherein:
the reported meter reading comprises a reported measurement and a reported authentication code; and
applying the pre-determined decoding algorithm comprises applying a first decoding scheme to the first subset of values of the authentication code to detect that the reported measurement in the reported meter reading does not equal the measurement in the meter reading.

26. The method of claim 25, wherein:
applying the pre-determined decoding algorithm further comprises applying a second decoding scheme to the second subset of values of the authentication code to detect that the reported authentication code in the reported meter reading does not equal the authentication code in the meter reading.

* * * * *